United States Patent [19]

Küpfer

[11] 4,430,654
[45] Feb. 7, 1984

[54] METHOD AND APPARATUS FOR SUPPRESSING CLUTTER

[75] Inventor: Hanspeter Küpfer, Uitikon, Switzerland

[73] Assignee: Siemens-Albis Aktiengesellschaft, Zurich, Switzerland

[21] Appl. No.: 392,624

[22] Filed: Jun. 28, 1982

Related U.S. Application Data

[63] Continuation of Ser. No. 112,197, Jan. 15, 1980, abandoned.

[30] Foreign Application Priority Data

Feb. 5, 1979 [CH] Switzerland ............... 1093/79

[51] Int. Cl.³ .............................................. G01S 13/00
[52] U.S. Cl. ................... 343/5 NQ; 343/5 W; 343/16 M
[58] Field of Search ................... 343/5 NQ, 7 A

[56] References Cited

U.S. PATENT DOCUMENTS

| 4,093,949 | 6/1978 | Evans | 343/5 NQ |
| 4,117,538 | 9/1978 | Shrader et al. | 364/517 |
| 4,219,816 | 8/1980 | Schenkel et al. | 343/16 M |

FOREIGN PATENT DOCUMENTS 2103466  8/1971  France .

Primary Examiner—Maynard R. Wilbur
Assistant Examiner—M. R. Gordon
Attorney, Agent, or Firm—Werner W. Kleeman

[57] ABSTRACT

A method and apparatus for automatic suppression of weather echoes or clutter which can disturbingly appear, apart from the flying target-Doppler signal as further Doppler signals in a pulse Doppler-tracking radar device containing quadrature channels, wherein there is regulated the frequency of the Doppler signals or the phase relationship between the Doppler signals and a reference signal derived from the transmitted signal.

3 Claims, 13 Drawing Figures

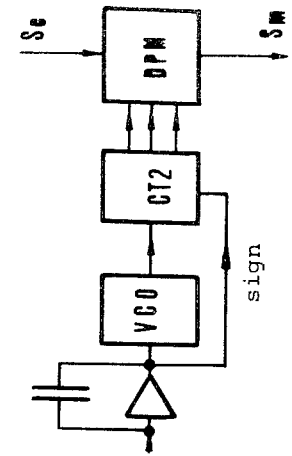
FIG. 11 DIGITAL MODULATOR FOR A PROPORTIONAL REGULATOR
FIG. 12 DIGITAL MODULATOR FOR AN INTEGRAL REGULATOR
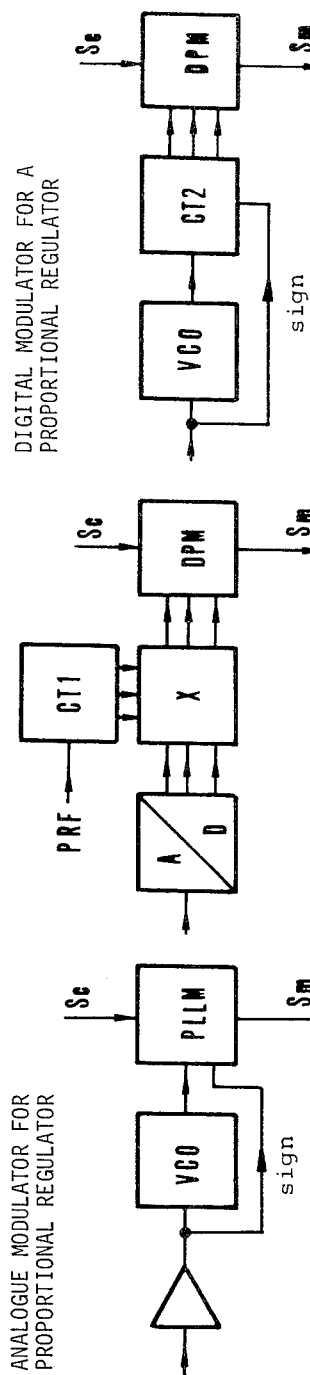
FIG. 9 DIGITAL MODULATOR FOR A PROPORTIONAL REGULATOR
FIG. 10 DIGITAL MODULATOR FOR AN INTEGRAL REGULATOR
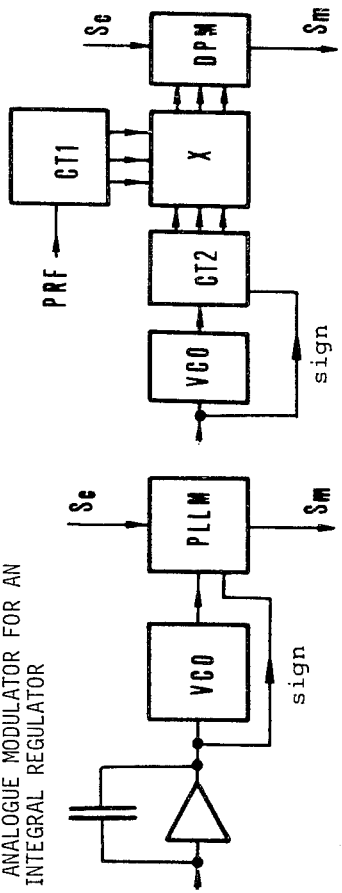
FIG. 7 ANALOGUE MODULATOR FOR PROPORTIONAL REGULATOR
FIG. 8 ANALOGUE MODULATOR FOR AN INTEGRAL REGULATOR

METHOD AND APPARATUS FOR SUPPRESSING CLUTTER

CROSS REFERENCE TO RELATED APPLICATION

This is a continuation application of my commonly assigned, copending U.S. application Ser. No. 06/112,197, field Jan. 15. 1980, now abandoned.

BACKGROUND OF THE INVENTION

The present invention relates to a new and improved method and apparatus for the automatic suppression of weather echoes, referred to as clutter, which can disturbingly arise, apart from the flying target or body-Doppler signal, as further Doppler signals in a pulse Doppler-tracking radar apparatus containing quadrature channels, wherein there is regulated the frequency of the Doppler signals or the phase relationship between the Doppler signals and a reference signal derived from the transmitted signal.

If tracking radar must follow a moving target in a space filled with moving clutter, then there should not be suppressed the fixed target echoes, rather the clutter from the moving weather zone, i.e. the moving echoes of a certain radial velocity region. This suppression basically can be carried out if, firstly, the difference of the radial velocities of target echoes and clutter are sufficiently large, and secondly, if the velocity of the clutter can be determined. The first condition cannot be influenced by the radar, but however often is fulfilled in many applications.

A known method for suppressing clutter is predicated upon a single-sideband modulation of a phase reference signal. For the momentary optimum compensation value determination there is known, for instance, from Swiss Pat. No. 566,012 a method wherein there is determined the clutter velocity in an additional clutter measuring gate. Here, a number of discrete compensation frequency values are automatically sampled and there is selected the most suitable value in each case for compensation of the clutter at the tracking measuring gate. However, such method has been found to be disadvantageous because the measurement of the clutter velocity and the clutter compensation cannot be related to the same spatial volume, since the clutter measuring gate must be shifted in relation to the tracking measuring gate. Additionally, an arrangement according to this method functions relatively slowly, since it is not regulated, and therefore, needs to pass through a great many non-useful compensation values. Since the sign of the velocity of the clutter can only be determined by sampling or testing a set of different compensation values, there cannot be obtained any assiduousness.

SUMMARY OF THE INVENTION

Therefore, it is a primary object of the present invention to provide a new and improved method of and apparatus for the automatic suppression of clutter which is not afflicted with these drawbacks.

The method of the invention is manifested by the features that for the automatic suppression of the clutter-Doppler signal a regulation circuit is closed, this regulation circuit being formed by a feedback loop leading from a receiver output to a modulator of a phase reference signal, whose fault signal is the output signal of a frequency discriminator having two inputs. The first input signal thereof is a quadrature difference signal obtained by subtracting the quadrature signal from both volume halves of a quadrature channel, to which there is added a weighted and sign affected part of the sum of such quadrature signals, and whose second input signal is an inphase-difference signal obtained by subtracting the inphase-signals from both volume halves of an inphase channel. Added to the inphase-difference signal is a weighted and sign affected part of the sum of such inphase signals, whereby the Doppler frequency of the clutter is directly measured at the tracking radar volume notwithstanding the presence of a flying object (target) to be tracked. Furthermore, the modulator to which there is infed the output signal of the frequency discriminator modulates the phase reference signal, and the output signal of the modulator is supplied to at least one phase amplitude detector of the inphase channel and by means of a 90°-phase shifter to at least one phase amplitude detector of the quadrature channel. In the frequency discriminator the input signals thereof are linked in such a manner that the direct-current voltage part of the discriminator output signal constitutes at least approximately a measure for the average Doppler frequency of the clutter signals which are not correlated between the volume halves. By means of this direct-current voltage part there is regulated the average frequency of the clutter Doppler signal to a value which is smaller than the lower threshold frequency of the Doppler filter, and thus suppressed by the Doppler filters.

The inventive apparatus operates in a systematic fashion and therefore renders possible the construction of a closed regulation circuit. The clutter measuring arrangement delivers an output signal constituting a sign affected measure for the deviation of optimum value of the compensation frequency. The measurement of the clutter velocity is accomplished therefore directly in the tracking volumes of the tracking radar apparatus and thus occurs notwithstanding the presence of a target.

This is possible due to the different correlation characteristics of the target echo and clutter in both radar volume halves, which are formed due to the usual two divisions of the volume for the purpose of forming fault signals as is usual in the technology of tracking radar. In both of these radar volume halves there is correlated the target echo to a high degreee, i.e. it possesses at both halves the same phase since it is caused by a small object in relation to the radar pulse length. On the other hand, the clutter is correlated only very slightly, i.e. the clutter possesses different phases, since only a small part of the reflected particles of the weather zone simultaneously reflect an echo part into both radar volume halves. Now if the stored echo signals of both volume halves are subtracted from one another, then there is essentially only obtained the movement components of the clutter (different phases), whereas the target echo (same phase) is eliminated. The ratio of radar radiation width to target width is extremely great at large distances, and therefore, when the volume is angularly bisected, is extremely favorable for the measurement of the clutter Doppler frequency according to the present invention. It is just with such large target distances, owing to the low intensity of the target echo which is to be evaluated, that there is particularly important good clutter suppression.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 7 to 12 illustrate different modulation circuits for the reference signal, and specifically wherein:

FIG. 7 is an analog modulator for a proportional regulator;

FIG. 8 is an analog modulator for an integral regulator;

FIG. 9 is a digital modulator for a proportional regulator;

FIG. 10 is a digital modulator for an integral regulator, wherein with the modulation circuitry of FIGS. 9 and 10 the modulation clock or cycle is dependent upon the pulse repetition frequency, in other words is PRF-synchronous.

FIG. 11 is a digital modulator for a proportional regulator;

FIG. 12 is a digital modulator for an integral regulator, wherein the modulation clock or cycle is free running for the modulation circuits according to FIGS. 11 and 12.

DETAILED DESCRIPTION OF THE PREFERRED EMBODIMENTS

Figure 1:
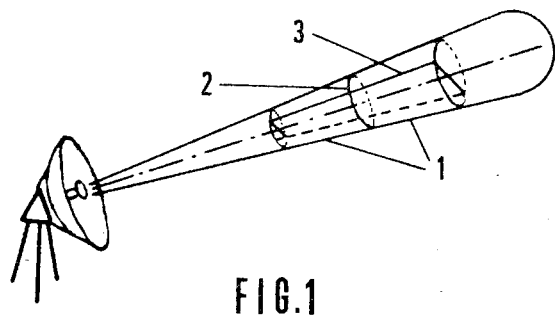
FIG. 1 illustrates a lobe-shaped, sharply focused radiation characteristic of a tracking radar having a tracking volume.

Describing now the drawings, according to the showing of FIG. 1 the radar volume 1 can be bisected, as far as distance is concerned, by a plane 2 oriented perpendicular to the axis of the radiation characteristic, into two distance volume halves or by a plane 3 containing the axis of the radiation characteristic, as far as angle is concerned, into two angle volume halves, and in the last case of particular significance is the azimuth angle and the elevation angle.

The Doppler frequency of the moving clutter is measured at the radar volumes of the tracking radar together with the target echo, i.e. exactly at that location where there should also be compensated the clutter. The inventive arangement can be employed both for distance measurement apparatus and also angle measurement apparatus. What is important for this arrangement is only that the radar volumes are divided into two practically equal halves A and B.

Figure 2:
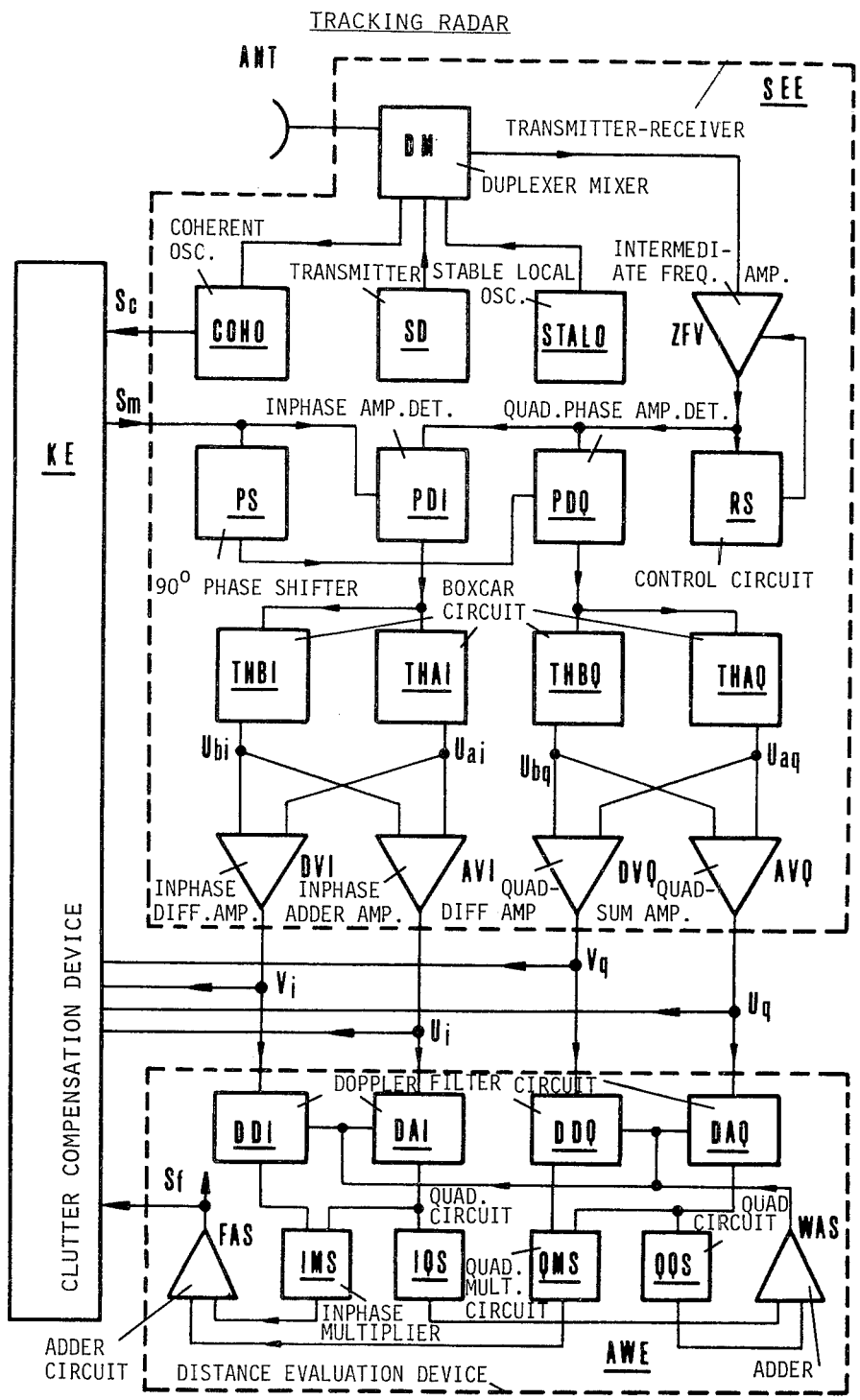
FIG. 2 is a block circuit diagram of a tracking radar with distance tracking by means of bisected distance gate and quadrature channel, wherein the angle tracking circuit has not been shown to simplify the illustration.

The pulse Doppler-tracking radar apparatus shown in FIG. 2 possesses an antenna ANT, a transmitter-receiver device SEE, a distance evaluation device AWE and a compensation device KE for clutter. In the transmitter-receiver device SEE a duplexer mixer DM is connected with the antenna ANT. The output signal of the duplexer mixer DM is delivered, on the one hand, by means of a regulatable intermediate frequency amplifier ZFV to the first input of a quadrature-phase amplitude detector PDQ and, on the other hand, to the first input of an inphase-amplitude detector PDI. On the one hand, a reference signal is delivered from a second output of the duplexer mixer DM by means of a coherent oscillator COHO and by means of the compensation device KE directly to the second input of the inphase-amplitude detector PDI and, on the other hand, by means of a 90°-phase shifter PS to the second input of the quadrature-phase amplitude detector PDQ. The output signal of the quadrature-phase amplitude detector PDQ is delivered, on the one hand, by means of a boxcar circuit THAQ for the first gate half to the first input of a quadrature-adding or summing amplifier AVQ and, on the other hand, by means of a boxcar circuit THBQ for the second gate half to the first input of a quadrature-difference amplifier DVQ. The output of the boxcar circuit THAQ is connected with the second input of the difference amplifier DVQ, and the output of the boxcar circuit THBQ is connected with the second input of the adding amplifier AVQ. The output signal Uq of the adding amplifier AVQ is delivered by means of a low-pass filter to the first input of the evaluation device AWE and a further input of the compensation device KE and the output signal Vq of the difference amplifier DVQ is delivered, if necessary, by means of a second low-pass filter to the second input of the evaluation device AWE and the third input of the compensation device KE. Additionally, the duplexer mixer DM, as is usual, is connected with a transmitter SD and with a stable local oscillator STALO.

The output signal of the inphase-amplitude detector PDI is delivered, on the one hand, by means of a boxcar circuit THAI for the first gate half with the first input of an inphase-adder amplifier AVI and, on the other hand, by means of a boxcar circuit THBI for the second gate half with the first input of an inphase-difference amplifier DVI. The output of the boxcar circuit THAI is also connected with the second input of the difference amplifier DVI, and the output of the boxcar circuit THBI is also connected with the second input of the adder amplifier AVI. The output signal Ui of the adder amplifier AVI is delivered, if desired, by means of a low-pass filter, to the third input of the evaluation device AWE and the fourth input of the compensation device KE. Moreover, the output signal Vi of the difference amplifier DVI is delivered, if desired, by means of a further low-pass filter to the fourth input of the evaluation device AWE and to the fifth input of the compensation device KE.

In the transmitter-receiver device SEE the intermediate frequency amplifier ZFV is controlled by a regulation or control circuit RS containing an amplitude detector, a summation gate circuit and a boxcar circuit.

In order to turn-off the compensation device KE the output of the coherent oscillator COHO can be directly connected with the reference input of the transmitter-receiver device SEE, i.e. with the input of the phase shifter PS and the inphase-amplitude detector PDI.

In the evaluation device AWE there are present two quadrature circuits QQS and IQS and four Doppler filter circuits DAQ, DDQ, DAI and DDI to which there are infed a respective one of the signals Uq, Vq, Ui and Vi, respectively, and an adding circuit FAS which delivers a distance-fault voltage signal Sf. The first input of the adding circuit FAS is connected with the output of an inphase multiplier circuit IMS which multiplies the output signals of the Doppler filter circuits DAI and DDI and whose second input is connected with the output of a quadrature-multiplier circuit QMS which multiplies the output signals of the Doppler filter circuits DAQ and DDQ. Additionally, the output signal of the Doppler filter circuit DAI is infed by means of the quadrature circuit IQS to the first input of an adder circuit WAS, and the output signal of the Doppler filter circuit DAQ is infed, by means of the quadrature circuit QQS, to the second input of this adder circuit WAS, whose output is connected with a respective regulation or control input of the Doppler filter circuits DAQ, DDQ, DAI and DDI, as shown in FIG. 2.

Figure 3:
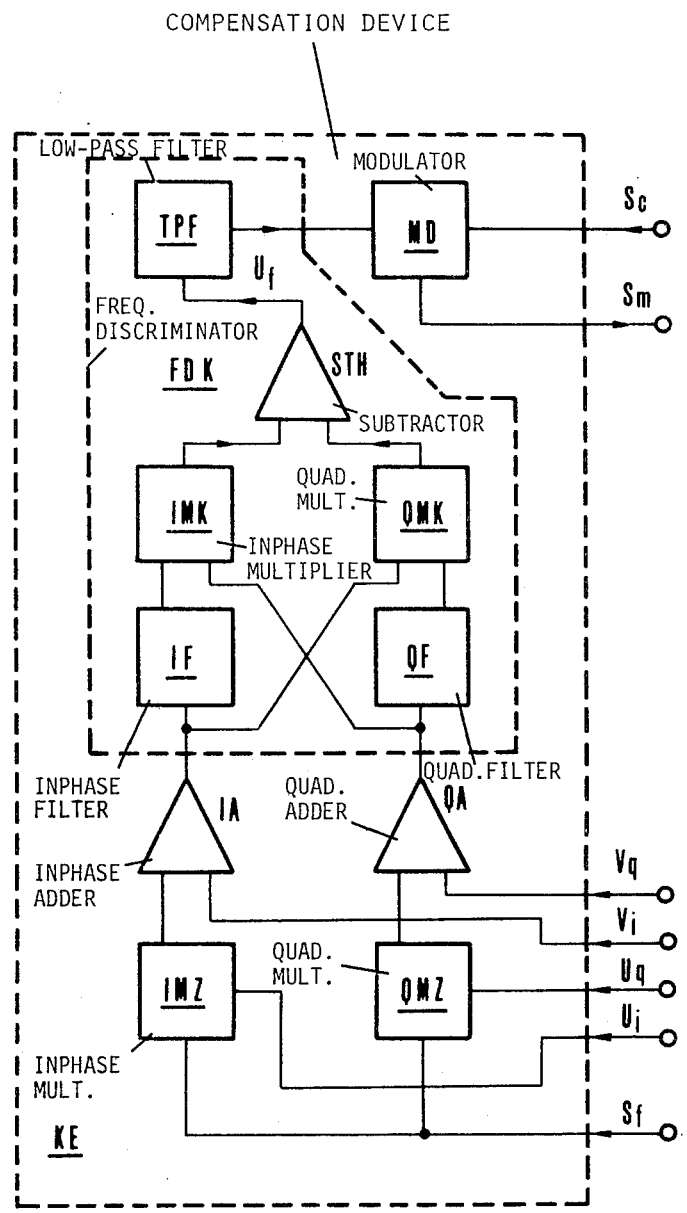
FIG. 3 illustrates in block-circuit diagram a compensation device KE for clutter.

FIG. 3 illustrates the construction of a compensation device KE having a subtracting unit or subtractor STH, the input side of which has infed thereto the fault voltage signal Sf, on the one hand, by means of the series circuit of a quadrature multiplier QMZ, a quadrature adder QA, a quadrature filter QF and a quadrature multiplier QMK and, on the other hand, by means of the series circuit of an inphase multiplier IMZ, an inphase adder IA, an inphase filter IF and an inphase multiplier IMK. The output of the inphase adder IA is connected with the second input of the quadrature multiplier QMK and the output of the quadrature adder QA is connected with the second input of the inphase multiplier IMK. The second input of the quadrature adder QA has infed thereto the input signal Vq and the second input of the inphase adder IA has infed thereto the input signal Vi. The second input of the quadrature multiplier QMZ has infed thereto the input signal Uq and the second input of the inphase multiplier IMZ has infed thereto the input signal Ui. The output of the subtracting unit or subtractor STH is connected by means of a low-pass filter TPF with the control input of a modulator MD, the output signal Sm of which is infed to the reference input of the transmitter-receiver device SEE. The other input of the modulator MD has infed thereto the output signal Sc of the coherent oscillator COHO, wherein the modulator MD for instance can be a single-sideband modulator or a phase modulator.

The circuit arrangement of FIGS. 2 and 3 functions in the following manner: a target and echo signal received by the antenna ANT is processed in conventional manner by the transmitter-receiver device SEE and the distance evaluation device AWE. To simplify the illustration of the drawings there have only been indicated the signals corresponding to a distance evaluation, although the inventive method also can be used both in a distance measuring device and in an angle measuring device.

Initially, there will be considered the case where only echo signals of the flying object (target) to be tracked are received, not however any clutter signals. At the first output of the transmitter-receiver device SEE there thus appears a summation signal:

$$Uq = Uaq + Ubq = Uzq$$

wherein the indexes a and b signify the one or the other gate half, and the index z signifies a target signal. There is valid for the difference signal at the second output the following relationship:

$$Vq = Ubq - Uaq = -\epsilon q \cdot Uzq$$

wherein $\epsilon q$ is defined as a measure for the target eccentricity which can pass through all values between $-1$ to $+1$. Thus there are obtained for Uaq and Ubq the values:

$$Uaq = (\tfrac{1}{2}) \cdot Uzq \cdot (1 + \epsilon q)$$

and $$Ubq = (\tfrac{1}{2}) \cdot Uzq \cdot (1 - \epsilon q)$$

The elimination of the movement component of the target by subtraction of the signals of both radar volume halves A and B is predicated upon the assumption that the target is centered in the radar volume. Upon occurrence of a drag error, i.e. when the target is not located at the center of the radar volume, this assumption is no longer fulfilled and during the subtraction of the signals from both volume halves A and B there remains a remainder of the target signal. This is undesired and can be eliminated in that there is added to the above-mentioned difference a weighted and sign affected part of the sum of the signals from both volume halves.

The sum signal Uq=Uzq, multiplied in the quadrature multiplier QMZ (FIG. 3) by the distance fault voltage signal Sf as the weighted voltage, is therefore added in the quadrature adder QA to the difference signal $Vq = -\epsilon q \cdot Uzq$, which then deliveres as the result a target signal which can be expressed by the following:

$$Urzq = -\epsilon q \cdot Uzq + Sf \cdot Uzq = Uzq \cdot (Sf - \epsilon q).$$

The corresponding holds true for the target signal Urzi of the inphase channel:

$$Urzi = Uzi \cdot (Sf - \epsilon i).$$

If the distance fault voltage or the weighting of the signal Sf are chosen to be equal to the eccentricity $\epsilon$, then there disappear the target signals Urzq and Urzi in the compensation device, i.e. generally the target signals Urzq and Urzi become null, when there is chosen $Sf = \epsilon q = \epsilon i = \epsilon$.

There now will be considered the case where there is only present a clutter signal. If there are assumed in both volume halves A and B on the average equal intensity, non-correlated weather echo or clutter signals, then also their sum Uq=Ucq and difference Vq=Vcq are not correlated to one another and in the mean are of equal intensity. After the weighting there add the outputs and in the quadrature channel the clutter signal Urc (c signifies clutter) becomes:

$$Urcq = \sqrt{Ucq^2 + (Sf \cdot Ucq)^2} = Ucq \sqrt{1 + Sf^2}.$$

The clutter part increases with weighting differing from null. Thus, there is no danger that the clutter part likewise will be eliminated. The same holds true for the inphase channel. There also can serve a different fault voltage Sf than that delivered by the radar as a measure for the target eccentricity.

At the output of the quardrature adder QA and the inphase adder IA there appears, according to the above computations, a respective signal Urcq and Urci, each freed of target echo, in the regulator feedback loop for compensation of the clutter in the tracking gate, wherein the signals Urci and Urcq differ by 90° in the clutter phase, i.e.

$$Urci = Urc \cdot \exp(jwt)$$

and $$Urcq = Urc \cdot \exp\left(j\left(wt - \frac{\pi}{2}\right)\right)$$

wherein the sign of $\pi/2$ corresponds to the sign of the movement direction of the clutter and w represents the Doppler-angular (radian) frequency of the clutter.

The output signal of the subtractor unit STH is formed as the difference of products, each of which is formed from the signals Urci and Urcq and their filtered values Urci' and Urcq'.

The filters IF and QF have the same amplitude response $A(w)$ and the same phase response $\Phi(w)$ which are governed by the complex transfer function $G(w)$ and are also defined as the real-$R(w)$ and imaginary parts or components $I(w)$ of the transfer function.

After the filter IF there appears:

$$Urci' = Urc \cdot [\exp(jwt)] \cdot (R(w) + j\, I(w)).$$

For the output signal of the filter QF there is correspondingly valid:

$$Urcq' = Urc \cdot [\exp j(wt \pm \pi/2)] \cdot (R(w) - j\, I(w)).$$

In the multipliers QMK and IMK the real parts of the input signals are multiplied as follows:

$$Re(Urcq) \cdot Re(Urci') = Uqi$$

and $$Re(Urci) \cdot Re(Urcq') = Uiq$$

From this there follows:

$$Uqi = Urc^2 \cdot (\mp \sin wt) \cdot [R(w) \cdot \cos wt - I(w) \cdot \sin wt]$$

and $$Uiq = Urc^2 \cdot \cos wt \cdot [\mp R(w) \cdot \sin wt \mp I(w) \cdot \cos wt].$$

In the subtractor unit STH there is formed the difference signal:

$$Uqi - Uiq = \pm Urc^2 \cdot I(w) = Uf$$

which does not have any alternating-current voltage part. The sign of the direct-current voltage signal Uf corresponds to the direction of the clutter velocity, whereas its magnitude is dependent upon the imaginary component of the filter transfer function for the clutter frequency w. Additionally, the output signal Uf is proportional to the clutter power.

With simultaneous presence of a number of clutter signals of different frequencies $w_n$ and amplitudes Urcn the output signal Ufn has a direct-current voltage component corresponding to the sum of the weighted output of the individual signals.

$$Ufn = \sum_{1}^{n} Urcn^2 \cdot I(w_n).$$

Figure 4:
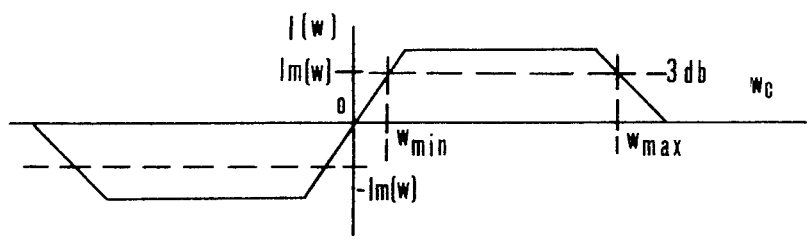
FIG. 4 illustrates the ideal characteristic of a frequency discriminator FDK.

Additionally, there are present alternating-current voltage components which arise with the frequency differences from the individual signals. These are suppressed by the subsequently connected low-pass filter TPF. The signal Ufn serves as a fault signal of the regulation circuit for suppressing the clutter in the evaluation device AWE. Therefore, the frequency response $I(w)$ of the frequency discriminator FDK must satisfy certain requirements. FIG. 4 shows an ideal frequency discriminator characteristic having a linear course of $I(w)$ between the values $+Im(w)$ for $+w_{min}$ and $-Im(w)$ for $-w_{min}$, wherein the reflection or mirroring at the coordinate null point corresponds to the previously mentioned sign reversal by the cutter velocity vector. To obtain a favorable characteristic the ratio $w_{max}/w_{min}$ (bandwidth) must be as large as possible and the waviness therebetween as small possible. At the region of the null point there must be strived for linearity. Filter circuits having a filter characteristic for $I(w)$ according to FIG. 4 can be quite well approximately realized for instance with the circuits of FIGS. 5 and 6. There are however sufficient simple high-pass or low-pass filters of the first order.

In the frequency discriminator FDK the filters QF and IF can be identical and, for instance, possess an easily realizable transfer function according to the equations:

$$Gv(\Omega) = \frac{1}{1 + j\Omega}$$

or $$Gd(\Omega) = \frac{j\Omega}{1 + j\Omega}$$

wherein $\Omega = w \cdot T$ constitutes the standardized frequency and T the time-constant.

Such filters, whose frequency course of the imaginary part at low frequencies is proportional to the frequency can be easily realized by RC-elements.

Figure 5:
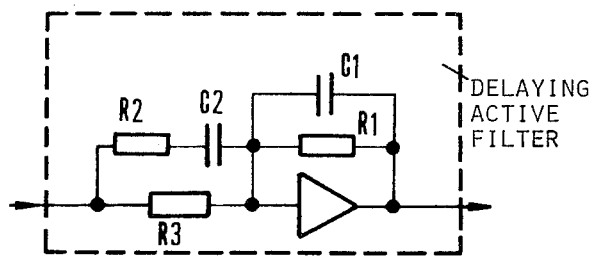
FIG. 5 is an embodiment of a delaying active filter of the second order.

If increased requirements are placed upon the bandwidth then there are used simple filters of higher order. FIG. 5 shows a possible realization of a filter as an active filter according to the equation:

$$Gvv\Omega = (1 + pT1)(1 + pT2)^{-1}(1 + pT3)^{-1} \text{ with } p = jw$$

The input of the filter constitutes a connection or terminal which, on the one hand, is connected by means of the series circuit of a resistance R2 and a capacitor C2 and, on the other hand, by means of a resistance R3 with the input of an operational amplifier, whose output forms the output of the filter and is connected with its input by means of the parallel circuit of a resistance R1 and a capacitor C1.

Figure 6:
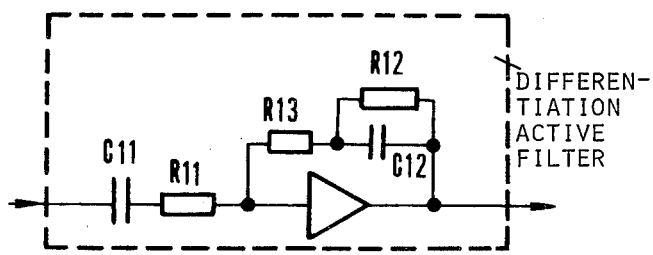
FIG. 6 is an embodiment of a differentiation active filter of the second order.

FIG. 6 shows a possible realization of a filter as an active filter according to the equation:

$$Gdd\, \Omega = T2 \cdot T3 \cdot p\,(1 + pT1)\,(1 + pT2)^{-1}(1 + pT3)^{-1} \cdot (T1)^{-1}$$

Here, the input of this filter constitutes a terminal or connection which is coupled by means of a capacitor C11 and a resistor R11 with the input of an operational amplifier, whose output forms the output of the filter and is connected with its input by means of a series circuit of a capacitor C12 and resistance R13, wherein the capacitor C12 has connected in parallel thereto a resistance or resistor R12, as shown.

For the automatic compensation of the moving clutter there must be closed by means of modulation circuit MD a regulation circuit seeking the condition Ufn=0, between the fault voltage signal Ufn and the reference signal at the input of the transmitter-receiver device SEE. If such modulation circuit MD contains a single-sideband modulator, then it delivers an output signal, whose frequency corresponds to the sum of the frequency $w_{ref}$, for instance the COHO-signal at the receiving coherent radar systems and the reference signal at fully coherent systems and the frequency $w_{ck}$ corresponds to a compensation signal dependent upon the fault voltage signal Ufn. Since the evaluation frequency of the output signal of the phase amplitude detectors PDQ and PDI (FIG. 2) corresponds to the difference of the frequencies of their input signals, the frequency $w_{ck}$ of the compensation signal is regulated such that the frequency $w_{ck}$ becomes as equal as possible to the frequency wc. Hence, the clutter Doppler signal is shifted into such a low frequency range that it is suppressed by the Doppler filters. But also the Doppler frequency of the target signal is shifted by the same amount, and therefore, as required, must be taken into account at the pulse repetition frequency-control, in order to prevent blind speeds or velocities. Since the mode of operation of the distance evaluation device AWE of FIG. 2 is known, it need not here be further described.

For the realization of the modulator MD, for instance as a single-sideband modulator there are conceivable a spate of possibilities. They differ through the use of a proportional regulation or an integral regulation, both designed in analog or digital circuit technology. With digital circuit technology it is additionally possible for the modulation clock to be chosen to be pulse repetition frequency synchronous (PRF) or freely running. The thus resulting six combination possibilities are shown in block circuit diagram in FIGS. 7 to 12. In these Figures reference characters CT1 and CT2 constitute counters, reference character X a digital multiplier, reference character A/D an analog-digital converter, reference character PLLM a PLL-modulator (phase-locked loop-modulator), reference character DPM a digital phase modulator, and VCO a voltage-controlled oscillator. Since these techniques are known they need not here be further described.

Figure 13:
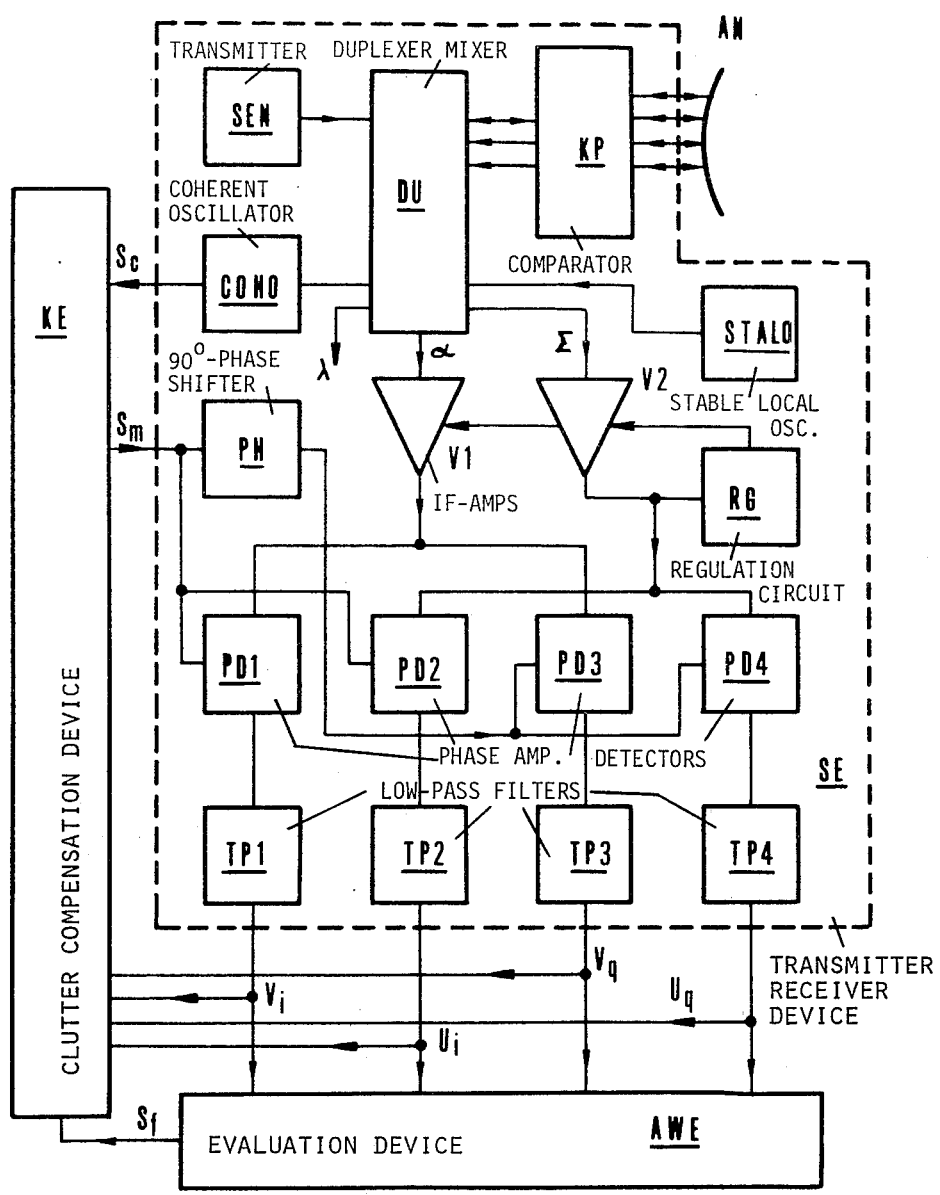
FIG. 13 is a block circuit diagram of a monopulse radar having quadrature channels, wherein there have been omitted the circuits for elevation angle and distance tracking.

In FIG. 13 there is illustrated the partial circuitry of a monopulse-tracking radar having quadrature channel and serving for azimuth angle tracking. This arrangement contains an antenna AN and a transmitter-receiver device SE as well as an evaluation device AWE and a compensation device KE of the previously described type. In the transmitter-receiver device SE there is provided a duplexer mixer DU which is connected by means of a respective input with a transmitter SEN and a stable local oscillator STALO and by means of suitable outputs with a coherent oscillator COHO, a comparator KP and respective intermediate frequency amplifiers V1 and V2. The comparator KP is connected in known manner with the antenna AN.

The output signal Sm of the compensation device KE is directly infed to the modulation inputs of two phase amplitude detectors PD1 and PD2 and by means of a 90°-phase shifter PH to the modulation inputs of two further phase amplitude detectors PD3 and PD4. The signal inputs of the phase amplitude detectors PD1 and PD3 are connected with the output of the intermediate frequency amplifier V1 and the signal inputs of the phase amplitude detectors PD2 and PD4 are connected with the output of the intermediate frequency amplifier V2; connected with this output is additionally the input of a regulation circuit RG containing an amplitude demodulatior, a summation gate and a box car circuit. The output signal of the regulation circuit RG serves for regulating the intermediate frequency amplifiers Vi and V2. The outputs of the phase amplitude detectors PD1, PD2, PD3 and PD4 are connected by means of a respective low-pass filter TP1, TP2, TP3 and TP4 with a respective input of the evaluation device AWE. In FIG. 2 the difference formation between the volume halves occurs in the difference forming circuits DVQ and DV1, whereas in FIG. 13 it is already formed in the comparator KP.

While there are shown and described present preferred embodiments of the invention, it is to be distinctly understood that the invention is not limited thereto but may be otherwise variously embodied and practised within the scope of the following claims. ACCORDINGLY,

What I claim is:

1. Apparatus for suppressing Doppler clutter signals arising apart from the flying-target Doppler signal as further Doppler signals in a pulse-Dippler-tracking radar system including a transmitter-receiver, an evaluation device and a clutter compensation device and containing a quadrature and inphase channels, the improvement which comprises:

said transmitter-receiver comprising means for generating a phase reference signal derived from its transmitted signal;

said transmitter-receiver further comprising means for generating a quadrature-difference siganl by subtracting the quadrature signals of both of the volume halves of a quadrature channel;

said transmitter-receiver further comprising means for generating an inphase-difference signal by subtracting the inphase-signals of both halves of an inphase-channel;

said clutter compensation device being connected to said transmitter-receiver to receive said phase reference signal and said quadrature and inphase difference signals;

said clutter compensation device comprising null frequency discriminator and modulator means;

said modulator means receiving via a signal input said phase reference signal from said transmitter-receiver and via a control input an output signal from said frequency discriminator means, which output signal has a direct-current voltage portion representative of the frequency of the Doppler clutter signal;

said modulator means generating a modulator output signal as a connected phase reference signal which is fed back to said transmitter-receiver;

said null frequency discriminator means comprises:

frequency discriminator means having two inputs, one each for receiving said quadrature and inphase-difference signals for generating an output signal whose sign and amplitude are representative of the sense and radial velocity of the clutter;

said transmitter-receiver further includes means for generating a guadrature sum signal by adding the quadrature signals of both of the volume halves of a quadrature channel;

said transmitter-receiver further comprises means for generating an inphase sum signal by adding the inphase signals of both halves of an inphase-channel, said evaluation device receives said quadrature-sum and difference and inphase-sum and difference signals and generates an error voltage signal therefrom;

said clutter compensation device further includes means for adding a weighted quadrature signal to said quadrature-difference signal, the resulting addition signal being fed to the quadrature signal input of said frequency discriminator means;

said clutter compensation device further includes means for adding a weighted inphase signal to said inphase-difference signal, the resulting addition signal being fed to the inphase signal input of said frequency discriminator means;

the weighted quadrature signal constitutes a weighted part of said quadrature-sum signal and the weighted inphase signal constitutes a weighted part of said inphase-sum signal; and the weighting of these signals is formed by a function of the target eccentricity, via said error voltage signal.

2. The apparatus as defined in claim 1, wherein:

said null frequency discriminator further comprises:
 a subtractor having an output and two inputs;
 a series connection of a quadrature filter and a first quadrature multiplier connected to a first input of said subtractor, the input of the quadrature filter receiving the quadrature-difference output signal of the transmitter-receiver;
 a series connection of an inphase filter and a first inphase multiplier connected to a second input of said subtractor, the input of the inphase filter receiving the inphase-difference output signal of the transmitter-receiver;
 the input of said inphase filter being further connected with a second input of said first quadrature multiplier and the input of said quadrature filter being further connected to a second input of said first inphase multiplier; and
 the output of said subtractor being connected to the control input of the modulator means of the clutter compensation device.

3. The apparatus as defined in claim 1, wherein:

said clutter compensation device further comprises:
 a quadrature adder connected to the input of the null frequency discriminator of the clutter compensation device, for transmitting said quadrature-difference signal thereto;
 an inphase adder connected to the input of said null frequency discriminator, for transmitting said inphase-difference signal thereto;
 a second qradrature multiplier for receiving said quadrature-sum and error voltage signals and being connected to an input of said quadrature adder for transmitting said weighted quadrature signal thereto; and
 a second inphase multiplier for receiving said inphase sum and error voltage signals and being connected to an input of said inphase adder and transmitting said weighted inphase signal thereto.

* * * * *